United States Patent [19]

Wolf

[11] Patent Number: 4,646,871
[45] Date of Patent: Mar. 3, 1987

[54] GAS-GUN FOR ACOUSTIC WELL SOUNDING

[75] Inventor: Alexander Wolf, Houston, Tex.

[73] Assignee: Keystone Development Corporation, Houston, Tex.

[21] Appl. No.: 646,860

[22] Filed: Sep. 4, 1984

[51] Int. Cl.$^4$ .................. G01V 1/04; G01V 1/133
[52] U.S. Cl. ................................ 181/106; 181/115; 181/117; 367/144
[58] Field of Search ............... 181/106, 110, 115, 117, 181/118, 120; 367/144

[56] References Cited

U.S. PATENT DOCUMENTS

| | | | |
|---|---|---|---|
| 2,560,911 | 7/1951 | Wolf | 367/99 |
| 3,249,177 | 5/1966 | Chelminski | 181/118 |
| 3,997,021 | 12/1976 | Chelminski | 181/106 |
| 4,230,201 | 10/1980 | Bays | 181/115 |
| 4,271,924 | 6/1981 | Chelminski | 181/120 |
| 4,408,676 | 10/1983 | McCoy | 181/113 |

OTHER PUBLICATIONS

"Instructions for Sonolog D—6C2 Well—Attachment", Wolf et al.

*Primary Examiner*—Richard D. Lovering
*Assistant Examiner*—Eric Jorgensen
*Attorney, Agent, or Firm*—Murray Robinson; Ned L. Conley; David A. Rose

[57] ABSTRACT

In the art of acoustic well sounding a gas-gun for the sudden discharge of a measured quantity of compressed gas, comprised of two chambers, viz. a discharge chamber closed at one end by a poppet, and on the opposite end by a power-head, the latter a cylinder including a sealed piston, with the poppet connected by sealed piston rod penetrating the cylinder head, and terminated at the piston. The entire assembly to be so proportioned that regardless of the position of the piston a gap remains between the piston and the cylinder-head penetrated by the piston rod. Means for connecting this gap to the inside of the discharge chamber through a check valve permits gas flow from the discharge chamber to the gap, but not in the reverse direction, and means for venting the gap to the atmosphere. A passage from the opposite side of the piston to the axial outlet of the discharge chamber, a spring or a positive locking device for pressing the poppet against the valve seat. The entire construction is limited by the requirement that the piston rod be smaller in diameter than the seat diameter of the poppet, and the latter to be smaller than the diameter of the piston.

18 Claims, 2 Drawing Figures

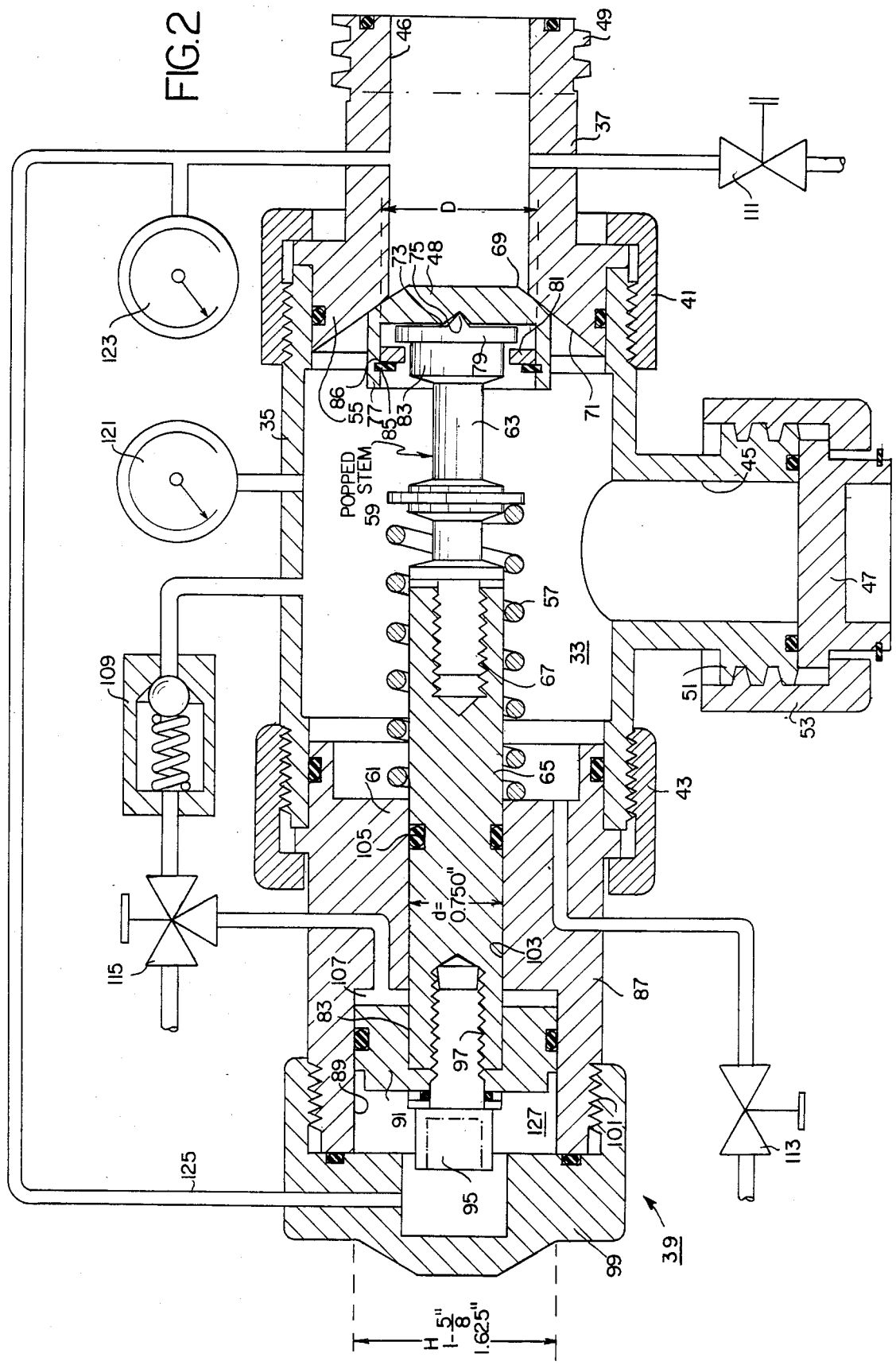

GAS-GUN FOR ACOUSTIC WELL SOUNDING

FIELD OF THE INVENTION

This invention pertains to the art of acoustic well sounding, and more specifically to a device for producing the required acoustic signal in and for an acoustic well sounding system.

An acoustic well sounder is an instrument for measuring the depth to the top of any liquid in the tubing of a well, or, more often in the annular space between tubing and casing of a well. It is used generally in connection with wells producing oil or gas, or both, but is not restricted to such use.

BRIEF DESCRIPTION OF THE DRAWINGS

To further pin point the subject of the invention and for a detailed description of a preferred embodiment thereof, reference will be made to the accompanying drawings wherein:

FIG. 2 is an axial section through a gas-gun for acoustical well sounding incorporating the invention and to be employed, e.g. as shown in FIG. 1.

Except for the schematic portions thereof, FIG. 2 is drawn to scale, one dimension being indicated therein from which absolute size of the structure can be determined. The conventions of the United States Patent and Trademark Office for drawings in patent cases have been employed, from which it will be seen that the entire structure is made of metal, e.g. steel, except for the O-ring seals, which are made of natural or synthetic rubber or other elastomer suitable to the environment.

BRIEF DISCUSSION OF THE PRIOR ART

Well Sounding

Figure 1:
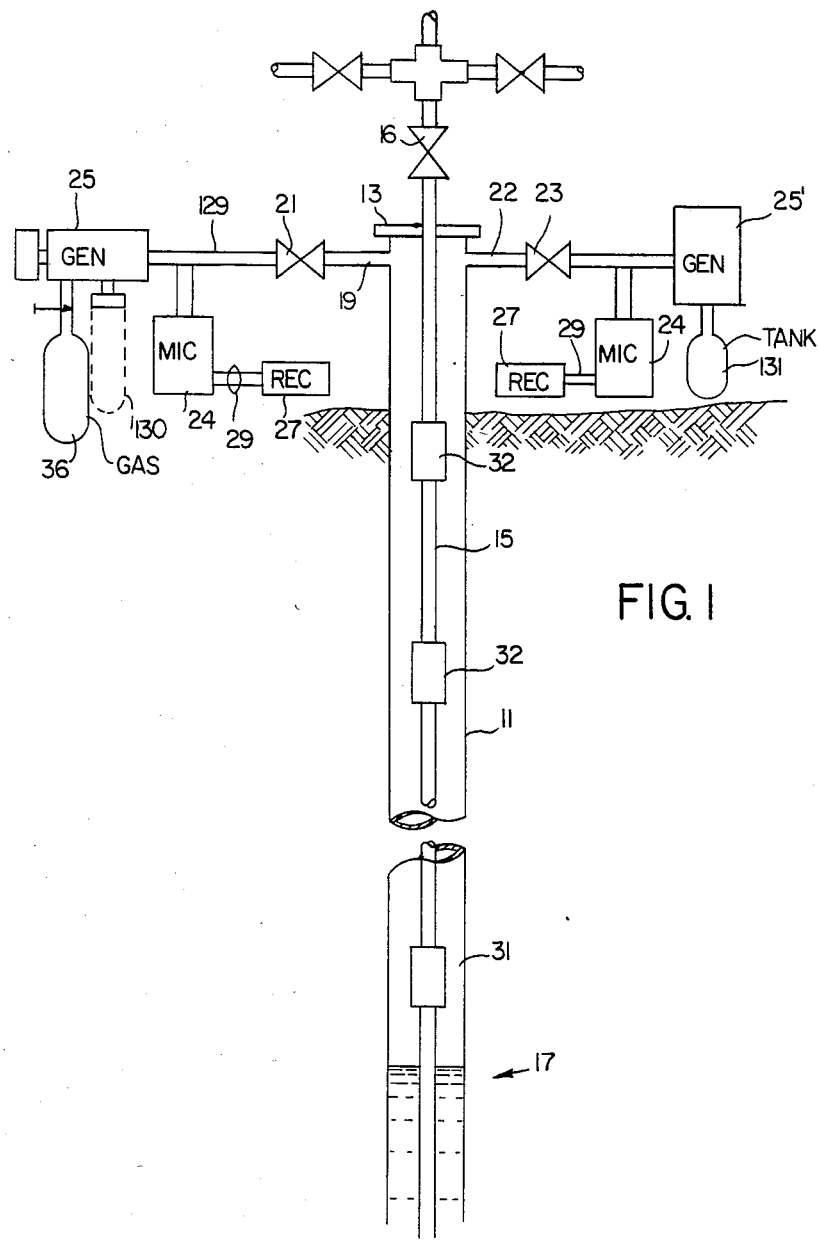
FIG. 1 is a schematic vertical section through a well with acoustic well sounding apparatus connected thereto.

The installation of a well sounder is shown schematically in FIG. 1, wherein there is shown the outer casing 11 of a well, closed at the top by casing-head 13. A string of tubing 15, which serves as conduit for the produced fluid, is installed inside the casing, forming an annular space between the two pipes. The tubing penetrates the casing-head, being sealed thereto, and connects to a master valve 16 leading to a cross and thence to two wing valve controlled flow outlets and a pressure gage. The tubing termination will not be discussed any further in this disclosure, although it may be used in measuring depth to fluid in the tubing, because this application of the invention does not differ materially from the similar measurement in the casing annulus as hereinafter described.

Referring still to FIG. 1, it is assumed that the annular space between casing and tubing is filled with gas down to some level 17, at which it is sealed by the top of the liquid standing in the casing. The casing head 13 is provided with an outlet 19, normally closed by wing valve 21. There may be other outlets such as 22, but these are closed, e.g. by wing valve 23, when the measurement is made.

The acoustic well sounder is connected to discharge into the casing annulus via a casing-head valve, e.g. valve 21, as shown schematically at the left in FIG. 1. It comprises three components, which need not physically be separate, viz.: (a) microphone 24, in a pressure-tight enclosure, for receiving transmitted and reflected acoustic pulses and converting them to electric signals, (b) means 25 for producing the required acoustic signal to be injected, and (c) a strip-chart recorder 27 of suitable design, connected by electrical conductors 29 to the output terminals of the microphone. The interior chamber of the signal generator is initially charged with high pressure gas from a source 30.

Alternatively, as shown schematically at the right in FIG. 1, the signal generator 25 may be connected to receive high pressure gas from the casing annulus, e.g. via wing valve 23, to be discharged into a receiving tank 31.

In either case, the acoustic pulses arriving at the casinghead are converted into electrical signals by electro-acoustic transducer or microphone 24, and transmitted by electrical wire 29 to strip-chart recorder 27, where they are amplified and conditioned by one or more amplifiers and recorded on a moving strip of paper.

Acoustic Signal Generator

The present invention is directed to the means of producing the acoustic signal. Such a signal is preferably a short unidirectional pressure pulse of either polarity. Thus a compressional pulse is produced by the sudden injection into the casing of a measured quantity of gas as per the arrangement at the left of FIG. 1; a rarefaction pulse is produced by the sudden withdrawal from the casing of a measured quantity of gas as per the arrangement at the right of FIG. 1. It will be understood that both arrangements would not be used simultaneously. The practical choice between the two methods depends on the gas pressure in the casing. In wells producing oil or gas, or both, the casing pressure may range from partial vacuum to several thousand pounds per square inch (psi). The signal of either polarity is propagated down the casing annulus with the velocity of sound. It is reflected back to the casing head, first by collars 32, which join the individual lengths of tubing, and finally by the top of any liquid standing in the annulus. Penetration of the pulse into the liquid is too small to have practical effects.

Pulse Shape

The device which produces the initial sound signal must deliver sufficient energy to the gas in the casing to override background noise, or, conversely, withdraw sufficient energy from the gas in the casing. It must also deliver it in a form which optimizes the recognition of reflections from the tubing collars. This is because, in general, the velocity of sound in the casing gas is not known with sufficient accuracy to permit the calculation of depth to liquid from transit time alone. On the other hand, the lengths of the pipe joints of which the tubing is composed are usually recorded. If the strip chart permits the recognition of a sufficient number of reflections from tubing collars, the depth to liquid is established by reference to the number of collar reflections between the casing head and the top of the liquid. Furthermore, since the velocity of sound usually varies between top and bottom the precision of the measurement is enhanced by recording collar reflections as far as possible down the well.

Theory and practical experience demonstrate that collar reflections are optimized by a pulse with a sharp front (short time-rise). This is because the collar is usually not more than about 6" long. The top of the collar forms a restriction in the annulus between casing and tubing. The restriction returns a reflection in phase with the arriving signal. On the other hand the bottom of the collar, just about 6" lower, constitutes an enlargement of the annulus. It returns a reflection opposite in phase to the signal. At a representative sound velocity of about 1000 ft/sec these two reflections differ in time by about 0.001 second. If the time-rise of the pulse is more than 0.001 second the two reflections interfere. The magnitude of the combined reflection decreases as the time-rise increases above about 0.001 second. These, of course, are approximations.

Rise-time of 0.001 second, or shorter, can be expected in the firing of a blank cartridge, since the combustion time is brief. See applicant's prior U.S. Pat. No. 2,560,911, the disclosure of which is incorporated herein by reference. Such a short rise time cannot be approached when compressed gas is released with a valve operated manually, as has been done in the past. Thus the collar reflections obtained with gas discharge in the past were usually inferior, i.e. fewer in number and clarity, as compared with those secured with blank cartridges. Nevertheless, gas discharge has been used where the use of explosives is precluded owing to safety regulations, or problems with the procurement of cartridges. See the model D-6G2 gas operated well sounder described in the leaflet published by Keystone Development Corporation, reprinted from the 33rd (1978–79) edition of the Composite Catalog of Oilfield Equipment and Services, the disclosure of which is incorporated herein by reference.

Seismic Exploration

Somewhat similar problems have been encountered in the art of seismic exploration of water covered areas. Due to various difficulties encountered and legal restriction imposed, explosive seismic sources have in many cases been replaced by gas guns. Gas guns have undergone considerable technological development, in particular the employment of snap action gas release valves. wherein slight opening of the valve produces great increase in the force tending to open the valve. See for example the disclosures of U.S. Pat. Nos. 3,249,177, 3,588,801 and 3,951,231.

SUMMARY OF THE INVENTION

The object of the present invention is to provide a gas-discharge valve for acoustic well sounding which opens sufficiently fast to equal or surpass blank cartridges in regard to the clarity and number of reflections from tubing collars in a well. Since the well sounder is a preferably portable device, capable of testing a number of wells in a single day, the gas gun should be reasonable in size and preferably be self-contained, i.e., not requiring a multiplicity of connections, or any power supply other than the compressed gas used to generate the initial signal.

According to the invention there is provided a pressure chamber having an inlet flow port and having an outlet flow port, the outlet flow port being controlled by a poppet valve. The flow ports are adapted for either one to be connected to a wing valve on the casing head of a well. The poppet valve is closed by movement in the direction of fluid flow out of the chamber so that internal pressure tends to hold the valve closed.

Fluid actuated means is connected to the stem of the poppet valve closure for moving the valve inwardly to open position. as soon as the valve opens slightly, the pressure inside the chamber is equalized with that downstream of the valve, eliminating the force on the valve closure that was tending to hold it closed, whereby the fluid actuating means rapidly opens the valve.

If the outlet flow port of the chamber (closed by the poppet valve) is connected to the well, the inlet flow port will have been closed and the chamber filled, e.g. through a fill or vent port, with gas at higher pressure than the well, so that opening of the poppet valve will cause a compressional pressure pulse to be delivered to the well. On the other hand, if the inlet flow port of the chamber is connected to the well, the outlet flow port (closed by the poppet valve) will be connected to a receiver at atmosphere pressure. and the chamber will be full of gas at well pressure (above atmosphere) so that opening of the poppet valve will delivery a rarefaction pressure pulse to the well.

The fluid actuated means comprises a fluid motor including e.g. a piston moving in a cylinder, which is closed at both ends, a piston rod connected to the piston and extending through a passage in an end wall of the cylinder, with means sealing between the piston rod and wall.

The cylinder end wall, through which extends the piston rod, forms one wall of the gas chamber, and the piston rod forms the output arm of the fluid motor and is connected to the stem of the poppet valve within the gas chamber.

The fluid motor cylinder, at the side of the piston where pressure tends to close the valve (the "valve close" side) is preferably connected by an equalizer flow path to the outlet flow port of the chamber, i.e., downstream of the poppet valve.

The fluid motor cylinder, at the side of the piston where pressure tends to open the poppet valve, (the "valve open" side), is controlled by a flow path to one flow way of an operator controlled (e.g. manual) three way valve. One of the other two flowways is connected to the atmosphere. The remaining flow way is connected to the interior of the gas chamber via a flow path which includes in series therewith a check valve which allow flow from the chamber to cylinder but not in the reverse direction.

A spring, e.g. a helical compression spring bearing at one end against a flange on the valve stem and at the other end against the common wall of the cylinder end chamber and concentric with the piston rod, biases the poppet valve to closed position.

The area of the poppet valve closure subject to pressure at the chamber's outlet flow port downstream thereof is smaller than the area of the piston subject to the same pressure so that such pressure tends to hold the valve closed when the poppet valve is closed.

Pressure inside the chamber, when the poppet valve is closed and gas has been admitted to the chamber, tends to hold the valve closed, but when chamber pressure is admitted to the fluid motor at the "valve open" side of the piston it overcomes the force biasing the poppet valve closed, the piston area being larger than that of the poppet valve seat; and as soon as the poppet valve opens slightly the pressure differential on opposite sides of the poppet valve closure tending to hold it closed disappears and the poppet valve opens rapidly.

In other words, when the piston and poppet valve are subject to the same pressure difference, i.e. chamber pressure on one side and pressure downstream of the poppet valve on the other side, the poppet valve opens, because the piston area is larger than the area of the poppet valve closure subject to the pressure differential.

This is true whether the chamber is pressured from a compressed gas source or with well pressure, and whether the pressure downstream of the poppet valve is well pressure or atmospheric.

The check valve prevents drop of the pressure on the "open valve" side of the piston when chamber pressure drops as the gas flows out of the chamber to the well. When it is desired to reset the well sounder, it is only necessary to return the three-way valve to its vent position so that the helical spring and the fluid motor will reclose the poppet valve.

Other features of novelty, objects, and advantages of the invention will appear from the following detailed description of a preferred embodiment thereof.

DESCRIPTION OF PREFERRED EMBODIMENT

While there are many forms which the gas gun may take, the principle of the invention is best shown by its preferred configuration shown in FIG. 2. The gas-gun may technically be described as employing a specialized, power-operated, normally closed, poppet valve.

Chamber

Referring to FIG. 2, the gas gun comprises a chamber 33 formed by a roughly cylindrical tubular housing 35, closed on one end by poppet valve 37, and closed on the opposite end by power head 39, the valve and power head each being secured to the housing by a conventional threaded union, as shown at 41 and 43. There is also an inlet 45, of the same size as outlet 46 of the poppet valve. Side inlet 45 is closed by cap 47 in normal operation, i.e. the case where external gas is injected into the well to create a compressional pulse. The side inlet is employed when a rarefaction pulse is to be generated. External threads 49 and 51 on outlet 46 and inlet 45 adapt them for connection, one or the other as desired, to a well, or in the case of inlet 45, to threaded collar 53 for retaining cap 47. External threads 49 and 51 are identical.

Poppet Valve

When all compartments of the gun are at the same pressure outlet port 46 is closed by poppet valve closure 48, which is held against the valve seat 55 by helical compression spring 57; bearing at one end against flange 59 on poppet valve steam 63 and at the outer end against end wall 61 of the power head of fluid motor 39. The spring is coaxial with valve stem 63 and with piston rod 65 screw connected to the stem at 67. The sealing surface 69 of the poppet valve closure disc is spherical. It rests in a depression or seating surface 71 provided by the valve seat 55. The depression has the shape of a truncated circular right cone.

To allow for axial misalignment, poppet closure disc 48 of the valve is flexibly connected to valve steam 63. Cf. U.S. Pat. No. 3,917,220. This is effected by providing valve closure or disc 48 with a conical central socket 73 which receives a conical pin 75 on the end of the valve stem, the pin having a smaller apex angle than the socket to allow the disc to rock relative to the pin in any direction about the rod axis. The closure disc is provided with a collar 77 which extends into the chamber. Valve stem 63 is provided with a flange 79 received in collar 77 and retained therein by a washer 81 fitted around hub 83 on the valve stem, snap ring 85 received in an annular groove 86 inside the collar overlying the washer and holding it in place. There is clearance between flange 79 and washer 81 and between flange 79 and valve disc 48 so that the disc is free to rock, but not so much clearance as to permit pin 75 to come entirely out of socket 73.

Fluid Motor

Power head 39 provides a fluid actuated motor for opening and closing the poppet valve. The motor includes a generally cylindrical block 87 having a cylindrical opening 89 within which is slidably sealingly disposed cylindrical piston 91. Piston 91 has a socket, 83 which fits over the end of piston rod 65. Piston 91 is secured to rod 65 by socket headed cap screw 95 threadly engaged with the rod at 97. The outer end of cylindrical opening 89 in block 87 is closed by screw cap 99, threadly connected to the cylinder block at 101.

Lengths and Diameters

Cylindrical piston rod 65 passes through cylindrical opening 103 in end wall 61 of the fluid motor cylinder block, being sealed thereto by O-ring 105, and connects to the poppet valve stem 63 as aforesaid. The length of the poppet valve closure valve stem and piston rod assembly provides a small gap 107 below the piston, i.e. between the piston and end wall 61, when the valve is closed. An important feature of the preferred embodiment of the invention is that the diameter (d) of the piston rod is smaller than the seat diameter (D) of poppet valve closure disc 48, and the latter is smaller than the diameter (H) of piston 91, the seat diameter (D) being the diameter of the circle of engagement of the conical valve seat and the spherical closure disc.

Auxiliary Valves

The gas gun is provided with a check-valve 109, and with three small manually-operated valves 111, 113, 115, which are shown schematically in FIG. 2. Valve 111 serves only as a vent for any pressure vessel connected to outlet 46. Valve 113 serves to admit gas from a supply cylinder 30 (see FIG. 1) to the discharge chamber 33 or as a vent for the discharge chamber. Valve 115 is a three-way valve, which switches gap 107, at the "open valve" side of the piston either to atmosphere, or through check-valve 109 to discharge chamber 33. In the latter position gas from the discharge chamber can flow into gap 107, but not in the reverse direction.

Gages

The two pressure gauges 121, 123 shown schematically in FIG. 2, are connected respectively to the discharge chamber and the outlet 46 to show the pressure therein. These pressure gauges are convenient, but they are not essential.

Equalizer Tube

FIG. 2 also shows schematically a tube 125 connecting outlet 46 to chamber 127 at the "close valve" side of piston 91. The function of this tube is to prevent the opening of the gasgun by pressure at its outlet port 46. As stated before, the diameter of the piston is greater than the seat diameter of the poppet valve disc, so that with equal pressures on the downstream side of the valve closure disc and on the upper or "close valve" side of the piston, the net effect of these pressures is a force tending to close the valve. The operation of the device is thus extended to pressure at the outlet port which may be many times what can practically be constrained by compression spring 57.

Operation at Low Well Pressure

Referring now to the left hand side of FIG. 1, as well as to FIG. 2, where only moderate pressure, e.g. less than 200 psi, exists in the casing of the well, acoustic well sounding is performed by injecting a short blast of higher-pressure gas into the casing. This is done by connecting outlet 46 of the gas gun to well casing wing valve 21 through a short conduit 129, in a branch of which is exposed microphone 24. Three way valve 115 (FIG. 2) is set to connect gap 107 to the atmosphere. Valve 111 is closed. Discharge chamber 33 is then filled with compressed gas from external cylinder 30 to a pressure several hundred pounds per sq. inch (psi) higher than the pressure in the casing. Valve 113 through which the gas was admitted is closed, and wing valve 21 (FIG. 1) is opened. The system is ready to go once electrical recorder 27 is started. It will be noted that in the condition described the poppet valve is held in the closed position partly by compression spring 57, but mainly by the gas pressure in chamber 33 against the upstream surface of poppet valve closure disc 48. Also, if, as is preferred, equalizer tube 125 is employed, well gas pressure on the "close valve" or "upper" side of the fluid motor piston 91 holds the poppet valve closed.

To discharge the gun the operator rotates three way valve 115 so as to connect gap 107 under the piston to check valve 109. Gas from the discharge chamber enters gap 107, exerting a force (to the left in FIG. 2) on the piston. Since the diameter of the piston is larger than the seat diameter of the poppet valve closure disc, equilibrium between the two forces is reached at a pressure in gap 107 somewhat lower than the pressure in the discharge chamber. The relatively minor force of compression spring 57, and also the force due to equalizer line 125, if employed, are here neglected. The equilibrium is highly unstable. Any further increase in pressure in gap 107 starts lifting the poppet closure disc off its seat. Gas rushes around the poppet closure disc destroying the pressure differential on the closure disc while the gas in gap 107 is confined by the action of check-valve 109. The poppet valve opens suddenly. In a prototype of the device, with piston diameter of 1.625" and valve seat diameter of 1.25" the moving part of the system slides 0.375" in less than 0.01 second when tested at a pressure of 600 pounds per sq. inch. It is believed that a valve opening time of less than 0.02 seconds will produce satisfactory results.

Those skilled in the art will immediately realize that the speed of the valve action depends on pressure in discharge chamber 33, on the mass of the moving components, and on relative dimensions of the various parts. The dimensions of the device may be changed to suit any special requirements, so long as the basic principles are recognized.

After the gun is discharged it remains open until the operator turns three way valve 115 to vent gap 107 under the actuating piston. The system is then ready to accept another charge of compressed gas for a repetition of the test, if desired.

A further feature of the gas-gun is the side port 45 in FIG. 2. Whereas the discharge chamber 33 is made large enough for usual applications, there may be cases where this volume is insufficient. In such cases the side port provides means for effectively enlarging the discharge chamber by attaching an auxiliary closed chamber (shown in dotted lines at 130 in FIG. 1) to the side port.

Operation at High Well Pressure

Where the pressure in the well-casing is sufficiently high, perhaps 200 psi, or more, the desired acoustic signal can be produced by discharging a measured quantity of casing gas into a closed chamber, which is initially at atmospheric pressur. The acoustic signal is the same as in the operation previously described, but is of inverse polarity, e.g., it is a unidirectional rarefaction rather than a compression.

As shown at the right of FIG. 1, the well casing annulus is now connected via outlet 22 and wing valve 23 to side inlet 45 of the gas gun, with microphone unit 24 interposed. An empty auxiliary chamber 131 (which may be the same as auxiliary chamber 130) is connected to the axial outlet 46. Once casing head wing valve 21 is opened, the gas-gun is ready. As described above, rotating valve 115 to allow influx of gas into gap 107 under the actuating piston, discharges casing gas into auxiliary chamber 131. The size of this chamber determines the quantity discharged. The gun remains open so that no disturbance is created while the sequence of reflections arrives at the microphone. Venting space 107 under the piston recloses the valve and subsequent venting of the auxiliary chamber with valve 111 restores the initial condition, so that the test can be repeated, if desired. Here again the bypass 125 is important, since it permits the valve to close against the pressure of casing gas on piston-rod 65. Without the bypass it would be necessary to close casing head wing valve 22, vent the entire system, and then re-open valve 22.

It should be understood that all of the operations described as performed with the well-sounder connected to the casing of a well, may as well be performed by connecting the instrument to an outlet of the central tubing, if measurement of depth to the top of the liquid in the tubing is desired. Also, whereas FIG. 1 shows the microphone connected between the gas-gun and valve 21 on the casing, the microphone in a separate chamber can as well be connected to a different outlet of the casing, such as at another wing valve, e.g., valve 23.

Those skilled in the art will recognize immediately that various changes can be made in the construction shown in FIG. 2 without departing from the spirit and aim of the invention. Thus spring 57 can as well be placed to the left of (above) piston 91, or the initial closing of the valve can be effected manually by a screw, or cam, or lever bearing on the top of the piston instead of by means of a spring. With the above manual closing of the valve, check valve 109 can be omitted, provided the passage from valve 115 to the discharge chamber 33 is sufficiently restricted. Side outlet 45 can be omitted if the gas gun is never to be used for the withdrawal of gas from a well, and also if the discharge chamber 33 is sufficiently large so that an auxiliary chamber is not ever needed. Again, with sufficient precision in the mechanical execution of the gas gun, a pressure tight closure of the poppet valve may be secured without the illustrated flexible stem connection. Even the bypass connection 125 can be omitted where the user is not concerned with the fact that casing valve 21 of FIG. 1 may then have to be closed and then re-opened whenever a test is to be repeated.

Summarizing, according to the invention there is provided a gas gun for use in acoustic well sounding, comprising a first chamber (discharge chamber) the outlet of which is closed by a poppet valve with the poppet closure disc attached to a sealed piston rod penetrating through the head of a cylinder and terminated in a sealed piston, the length of the piston rod being such that a gap always remains between the piston and the cylinder head, and means for connecting this gap either to the discharge chamber or to the atmosphere. The actuating piston must be larger in diameter than the seat diameter of the poppet, and the latter must be larger in diameter than the piston rod. The piston rod diameter must be smaller than the seat diameter of the poppet in order that when the chamber is filled with gas under pressure the valve will stay closed. The seat diameter of the poppet valve closure must be smaller than the piston diameter so that when the gas in the chamber is admitted to the clearance space under the piston, the valve will open.

For further details of the operation of the invention one can refer to the brochure "Instructions for SONO-LOG D-6C2 WELL-ATTACHMENT" prepared by Keystone Development Corporation, the first version of which brochure was assembled probably about Feb. 6, 1984, when the first unit was shipped.

I claim:

1. Gas gun for use in well sounding comprising:
a chamber having an outlet flow port downstream of a poppet valve adapted for connection to a well pipe,
said poppet valve controlling flow through said outlet flow port,
said poppet valve including a seat and a closure and a stem,
said poppet valve opening by movement of said closure into said chamber, whereby pressure in said chamber higher than in said port creates a force tending to close the valve, and
gas pressure means connected to said stem for rapidly opening said poppet valve to create a pulse of pressure change to be delivered to such well pipe,
said stem extending slidably through a port in said chamber in fluid tight relationship therewith and connected inside said chamber to said closure,
said valve closure and stem and said gas pressure means for opening said poppet valve being free of rigid axial restraint to allow the poppet valve closure to move away from said seat when said gas pressure means is actuated and closing pressure differential across said closure is reduced by initial opening of the valve.

2. Apparatus according to claim 1, said gas pressure means comprising a fluid motor connected to said stem means outside of said chamber and operator controlled means for discharging gas from said chamber to said motor.

3. Apparatus according to claim 1, said poppet valve including a valve stem connected to said closure extending into said chamber,
said gas pressure means comprising a fluid motor including a piston movably mounted in a cylinder having end walls,
said piston having a rod connected thereto which rod extends through one end wall of the cylinder and is also connected to said valve stem, said valve stem and rod forming said stem means.

4. Apparatus according to claim 3, said piston being separated from said end wall when said closure engages said seat.

5. Apparatus according to claim 3, said rod where it extends through said one end wall of the chamber having a smaller cross-sectional area than the cross-sectional area of the valve seat where it engages said closure.

6. Apparatus according to claim 5, the cross sectional area of said piston being greater than said cross sectional area of said valve seat where it engages said closure, and operator controlled means for discharging gas from said chamber to said motor between said piston and said end wall.

7. Apparatus according to claim 3 including a flow path equalizing pressure between that at the side of said piston opposite from said one end wall and that at said chamber outlet downstream from said poppet valve.

8. Apparatus according to claim 3, said operator controlled means including a three way valve adapted selectively to connect said cylinder at the side of the piston adjacent said one end wall to atmosphere or to said chamber.

9. Apparatus according to claim 8 including a flow path connecting said three way valve to said chamber and a check valve in the last said flow path preventing flow through the check valve toward the chamber.

10. Apparatus according to claim 9 including valve controlled means besides said three way valve for admitting gas under pressure to said chamber.

11. Apparatus according to claim 10 including valve controlled means for exhausting gas from said chamber outlet downstream of said poppet valve.

12. Apparatus according to claim 11 including means to indicate pressure in said chamber.

13. Apparatus according to claim 12 including means to indicate pressure in said chamber outlet downstream of said poppet valve.

14. Apparatus according to claim 9, including an inlet to said chamber adapted selectively to be connected to a well pipe or to an auxiliary gas chamber or be closed.

15. Apparatus according to claim 14 including an auxiliary gas chamber connected to said inlet.

16. Apparatus according to claim 14 including a gas receiver connected to said chamber downstream of said poppet valve outlet.

17. Apparatus according to claim 1 including means for receiving and recording pressure pulses between said valves.

18. Apparatus according to claim 3, said valve stem being rockably connected to said poppet valve closure.

* * * * *

UNITED STATES PATENT AND TRADEMARK OFFICE
CERTIFICATE OF CORRECTION

PATENT NO. : 4,646,871
DATED : MARCH 3, 1987
INVENTOR(S) : ALEXANDER WOLF

It is certified that error appears in the above—identified patent and that said Letters Patent is hereby corrected as shown below:

Column 4, Line 13; change "." to -- , --.

Column 4, Line 15; change "delivery" to -- deliver --.

Column 4, Line 35; change "controlled" to -- connected --.

Column 5, Line 55; change "steam" to -- stem --.

Column 8, Line 7; change "pressur" to -- pressure --.

Column 10, Line 52; insert -- outlet -- after the word "chamber".

Column 10, Line 53; delete "outlet".

Signed and Sealed this

Eighteenth Day of August, 1987

*Attest:*

DONALD J. QUIGG

*Attesting Officer*   *Commissioner of Patents and Trademarks*